United States Patent [19]

Yamamoto et al.

[11] 4,146,529
[45] Mar. 27, 1979

[54] PROCESS FOR THE PRODUCTION OF MODIFIED POLYOLEFIN

[75] Inventors: Noboru Yamamoto; Masaaki Isoi, both of Ohi; Maoto Yoda, Kawagoe; Shozo Wada, Zushi, all of Japan

[73] Assignee: Toa Nenryo Kogyo Kabushiki Kaisha, Tokyo, Japan

[21] Appl. No.: 838,015

[22] Filed: Sep. 29, 1977

Related U.S. Application Data

[63] Continuation of Ser. No. 671,076, Mar. 29, 1976, abandoned.

[51] Int. Cl.² .................. C08F 255/02; C08F 255/04; C08F 255/00; C08K 7/14
[52] U.S. Cl. .............................. 260/42.18; 260/878 R
[58] Field of Search .................... 260/42.18, 878 R

[56] References Cited

U.S. PATENT DOCUMENTS

| | | | |
|---|---|---|---|
| 3,751,397 | 8/1973 | Muto | 260/878 R |
| 3,862,265 | 1/1975 | Steinkamp et al. | 260/878 R |
| 3,928,687 | 12/1975 | Wada et al. | 260/42.18 |
| 4,000,111 | 12/1976 | Henman et al. | 260/878 R |

Primary Examiner—Alan Holler
Attorney, Agent, or Firm—W. T. Clarke; M. B. Kurtzman

[57] ABSTRACT

A process for the production of modified polyolefins by combining a polyolefin with one or more carboxylic acids or their anhydrides in the presence of a radical producing agent in an extruder and in the presence of an organosilane. If desired glass fibers can also be incorporated at the same time.

13 Claims, No Drawings

PROCESS FOR THE PRODUCTION OF MODIFIED POLYOLEFIN

This is a continuation of application Ser. No. 671,076, filed Mar. 29, 1976, now abandoned.

FIELD OF THE INVENTION

This invention relates to a process for the modification of polyolefins and more particularly to a process for the production of modified polyolefins by combining a polyolefin chemically with at least one alicyclic carboxylic acid having a cis form non-conjugated double bond, alpha, beta unsaturated carboxylic acids (hereinafter referred to as "unsaturated carboxylic acid") and/or their anhydrides in the presence of a radical producing agent in the molten state particularly in an extruder, wherein, beginning, during or after the above described addition reaction, the modified polyolefin under molten state is reacted with at least one organosilane compound having an amino group or epoxy group (hereinafter referred to as "organosilane compound"), thereby fixing effectively the unreacted unsaturated carboxylic acids or anhydrides thereof remaining in the modified polyolefin into the polyolefin, whereby a modified polymer having excellent adhesiveness is obtained, while release of the unreacted unsaturated carboxylic acids or anhydrides thereof is suppressed. Accordingly, irritating odors which would otherwise be released during the production, working or molding of the modified polyolefin and plate-out on the chill-roll during the molding of cast film are suppressed.

DESCRIPTION OF THE PRIOR ART

Polyolefins such as polyethylene, polypropylene and polybutene-1 are non-polar and generally crystalline and have a number of advantages in practical use, but use of these resins is considerably restricted because of their poor adhesiveness to glass fibers, metals and polar polymers and poor printing or dyeing properties. In order to overcome the above-mentioned disadvantages of polyolefins, it has hitherto been proposed to incorporate polar groups in a molecule of polyolefin by grafting a polar monomer, especially an unsaturated carboxylic acid or its anhydride. For example, it has been proposed to add maleic anhydride, and endo-bicyclo[2,2,1]-5-heptene-2,3-dicarboxylic acids or their anhydrides to polypropylene. The modification reaction of a polyolefin by such an unsaturated carboxylic acid or its anhydride can be carried out by first dissolving the polyolefin in a solvent or melting it and adding the unsaturated carboxylic acid or its anhydride and a radical producing agent thereto, but the first mentioned method has disadvantages because of the number of processing steps needed, such as dissolving of polymer, reaction, reprecipitation, filtration and drying; it is preferable for industrial use to carry out these modifications in an extruder.

In the molten state method, particularly modification in the extruder, for example, to feed a polyolefin powder or pellets together with the unsaturated carboxylic acid or its anhydride and a radical producing agent to an extruder and then to pass the feed through the extruder at a temperature higher than that of the melting point of the polyolefin is an extremely practical method from the viewpoint of economics and workability. However, it is unavoidable that the modified polyolefin obtained by modification reaction in an extruder contains some of the unreacted polar monomer, a part of which leaves through the vent hole of the extruder or from the surface of the molten polymer extruded from the die during the modification reaction. or a part of which will come out during a secondary working of the modified polyolefin such as in blending with glass fiber at a high temperature or molding of the modified polyolefin at a high temperature, causing an irritating odor.

In order to suppress the generation of this odor, the unreacted unsaturated carboxylic acid or its anhydride may be removed from the modified polyolefin. To accomplish removal, it is necessary to dissolve the modified polyolefin in a solvent followed by reprecipitation; or to extract the acid with a solvent capable of dissolving the unreacted carboxylic acid or its anhydride only and not dissolving the modified polyolefin. These methods have as not been put to practical use on a commercial scale.

An object of this invention is the improvement of the process for the modification of polyolefins by chemical combination with at least one unsaturated carboxylic acid. Another object of this invention is to suppress the generation of an irritating odor during the production of modified polyolefin in an extruder.

Still another object of this invention is to obtain modified polyolefin having good adhesiveness, and good printing and dyeing properties.

A further object of this invention is to provide a new process wherein production of modified polyolefins and surface-treatment of glass fiber are carried out at the same time.

SUMMARY OF THE INVENTION

The above objects are attained in accordance with the invention in a process for the production of modified polyolefins which comprises reacting a polyolefin with at least one alicyclic carboxylic acid having a cis form non-conjugated double bond, or alpha beta unsaturated carboxylic acids and their anhydrides in the molten state, in an extruder in the presence of a radical producing agent, and at least one organosilane compound having amino groups or epoxy groups.

In a modification of the invention a polyolefin is reacted with at least one alicyclic carboxylic acid having a cis form non-conjugated double bond or alpha beta unsaturated carboxylic acids and their anhydrides in the molten state in an extruder in the presence of a radical producing agent, at least one organo silane compound having amino groups or epoxy groups and glass fibers.

In a preferred embodiment, the unreacted unsaturated carboxylic acid or its anhydride remaining in the modified polyolefin is fixed in the modified polyolefin as an amide compound or an ester compound, whereby irritating odor due to the unsaturated carboxylic acid or its anhydride during production, processing or molding of the modified polyolefin or plate-out during molding of film can be suppressed. At least one organosilane compound is added in a proportion of 4 molar equivalents or less with reference to all the carboxylic acid or its anhydride, that is to say, total unsaturated carboxylic acid or its anhydride added to polyolefin and including unreacted carboxylic acid (hereinafter referred to as "total carboxylic acid").

DETAILED DESCRIPTION OF THE INVENTION

A feature of the present invention is that the organosilane compound added to modified polyolefin reacts with the unreacted unsaturated carboxylic acids or their anhydride remaining in the modified polyolefin are effectively fixed by the organosilane compound in a small quantity, that is, four molar equivalents or less, preferably two molar equivalents or less with reference to all carboxylic acids, and consequently, there takes place no generation of an irritating odor due to release of the unreacted carboxylic acid when the modified polyolefin is thereafter heated and melted.

Another feature of the invention is that workability and moldability are improved by adding the organosilane compound. That is to say, in the production of film from modified polyolefin containing a small quantity unreacted unsaturated carboxylic acid or its anhydride, the unreacted unsaturated carboxylic acid or its anhydride are released from the surface of the molten resin discharged from the die and thereby cause irritating odor, and in the chill roll process, they are deposited on the chilled roll as plate out and tarnish it, thereby making long time continuous operation impossible.

However, in the case of the modified polypropylene of this invention with added organosilane compound, since unreacted carboxylic acid or its anhydride is effectively fixed in the modified polyolefin, an irritating odor is almost non-existent and at same time the plate out on the chill roll is remarkably decreased thereby enabling long time continuous operation. Moreover, the organosilane compounds of this invention not only fix the unreacted unsaturated carboxylic acid or its anhydride, but also effectively act as nucleating agent and slip agents, whereby fine films having high gloss and high transparency are obtained; moreover the winding and rewinding of the film is very easilu carried out, and the creasing and variation in quality of the film doesn't occur and winding characteristics are excellent. That is to say, a fine film is given according to this invention without adding nucleating agent and slip agent which are generally required in the production of polyolefin film.

Another feature of this invention is that the modified polyolefin reacted with organosilane compound is suitable for coating with metal on its surface by vacuum metallizing. That is to say, polyolefin film has generally poor adherence to a metal coating produced by vacuum metallizing owing to its non polar properties. In one known method vinylidene chloride having polarity and affinity for polyolefin in some degree is spread on the surface of the polyolefin as primer before the vacuum metallizing is carried out, but this product has only limited use because of the cost and the uneven level of results. Film made from modified polyolefin has good adhesion to a metal coating produced by vacuum metallizing without primer treatment, but if a slip agent is used in order to improve the workability of the film production process, good adhesiveness of film is not obtained. On the other hand, by means of the modified polyolefin of this invention, as above mentioned, a fine film is obtained with good workability, without using a slip agent and a metal coating produced by vacuum metallizing on the said film has a better adhesion thereto than to the film made from modified polyolefin film (without slip agent) without adding the organosilane compound.

Another feature of the invention is that the modified polyolefin of the invention, wherein unreacted unsaturated carboxylic acid or its anhydride is fixed by adding a small amount of organosilane compound has improved adhesiveness for metal or glass than modified polyolefin without adding organosilane compound, especially when the amount of added organosilane compound is two molar equivalents or less with reference to total carboxylic acid in the polyolefin. Moreover, since the amount of added organosilane compound is very small, the polyolefin's original properties such as mechanical, thermal and chemical properties are hardly affected. And moreover, the modified polyolefin of the invention has improved properties of printing, spreading, dyeing, metal coating and hot stamping with metal film than modified polyolefin without the added organosilane compound. Yet another feature of the invention is that glass fiber-reinforced polyolefins of excellent workability as well as mechanical properties can be obtained by blending the modified polyolefins treated according to the invention with glass fibers. It is well known that glass fiber-reinforced polyolefins having excellent mechanical properties can be obtained by blending polyolefins modified by unsaturated carboxylic acids or their anhydrides with glass fibers. However, since this method is ordinarily carried out using an extruder and, in the prior art method some unreacted carboxylic acid or anhydride thereof is contained in the modified polyolefin, the generation of an irritating odor due to release of unreacted carboxylic acid is unavoidable in the step of blending glass fiber or in the step of molding the glass fiber-reinforced polyolefin.

According to the process of the invention, however, the unreacted carboxylic acid or its anhydride is fixed in the modified polyolefin by addition of a small amount of organosilane compound, so that generation of an irritating odor in the above-mentioned steps is markedly suppressed, and, furthermore, glass fiber-reinforced polyolefins having similar or superior mechanical properties can be obtained as compared with glass fiber-reinforced polyolefins in which no organosilane compound is added. Glass fibers used with the modified polyolefin of this invention need not be pretreated with silane, since the organosilane compound present in the polyolefin of the invention treats the surface of the glass fiber, untreated or pretreated glass fiber produces the same result. In this case, the quantity of added organosilane compound and the time of addition is regulated.

Polyolefins utilizable in this invention are, for example, poly$\alpha$-olefins or mixtures thereof such as polyethylene, polypropylene, ethylene-propylene copolymer, and polybutene-1.

Examples of prepared alicyclic carboxylic acids having a cis form non-conjugated double bond or their anhydrides are cis-4-cyclohexene-1,2-dicarboxylic acid, endo-bicyclo[2,2,1]-5-heptene-2,3-dicarboxylic acid and their anhydrides, and examples of preferred $\gamma,\beta$-unsaturated carboxylic acids or their anhydrides are maleic anhydride and acrylic acid. In addition, maleic acid, fumaric acid, itaconic acid, citraconic acid, methacrylic acid, crotonic acid, isocrotonic acid, itaconic anhydride or citraconic anhydride can also be used.

The modification of a polyolefin with an unsaturated carboxylic acid or its anhydride according to the present invention is carried out using any type apparatus which can hold a polymer in molten state, preferably an extruder, injection molder, kneader or mixer. Particularly, it is preferred that the modification be carried out by feeding polyolefin powder or pellets, unsaturated carboxylic acid or anhydride and suitable radical producing agent after being mixed (or individually without being mixed) to an extruder and then passing the mixture through the extruder or injection molder at a temperature higher than the melting point of said polyolefin.

Addition of an organosilane compound according to the invention may be carried out independently after the above-mentioned modification reaction. For example, the modified polyolefin pellets obtained by the above mentioned modification reaction are mixed with the organosilane compound and again passed through the extruder at a temperature higher than the melting point of the polyolefin. On the other hand, the above mentioned modification reaction and addition of organosilane compound may be carried out at the same time, namely, polyolefin pellets or powder, unsaturated carboxylic acid or its anhydride, radical producing agent and organosilane compound are mixed or added individually and passed through the extruder.

A more preferred method for modifying a polyolefin with an unsaturated carboxylic acid or its anhydride in an extruder consists in introducing organosilane compound forcibly into the middle of the extruder barrel and carrying out the reaction from this point to the outlet of the extruder. According to the last two methods, the unreacted carboxylic acid or anhydride thereof contained already in the modified polyolefin is fixed in the modified polyolefin by the organosilane compound before the modified polyolefin leaves the extruder, so generation of an irritating odor due to the unreacted unsaturated carboxylic acid, which takes place often in the case of modifying a polyolefin by an unsaturated carboxylic acid or its anhydride, can effectively be suppressed.

The organosilane compounds useful in the process of the invention includes aminosilanes and epoxysilanes. Preferred examples of the aminosilanes are γ-aminopropyltriethoxysilane, N-(β-aminoethyl)-γ-aminopropyl-trimethoxysilane and N-(β-aminoethyl)-γ-aminopropyl-methyldimethyoxysilane and preferred examples of the epoxysilanes are β-(3,4-epoxycyclohexyl)-ethyltrimethoxysilane and γ-glycidoxypropyl-trimethoxysilane. However, organosilanes useful in the invention are not to be interpreted as limited to these examples.

PREFERRED EMBODIMENTS

The quantity of organosilane to be added to a modified polyolefin according to the invention is from about 0.1 to about 4.0 molar equivalents, preferably from about 0.2 to about 2.0 molar equivalents with reference to all the carboxylic acid or anhydride thereof contained in the modified polyolefin. Where the quantity of organosilane compound is more than 4 molar equivalents, the adhesiveness of the modified polyolefin is lowered and where less than about 0.1 molar equivalent, the effect of fixing the unreacted carboxylic acid or anhydride thereof in the polyolefin and thus suppressing generation of an irritating odor during heating is insufficient. In the case of a range of about 0.2 to about 2.0 molar equivalents, in particular, not only is an irritating odor during heating and plate out during production of film sufficiently suppressed, but also the adhesiveness to metals or glass is much improved as compared with the case of polyolefins modified only by unsaturated carboxylic acids or anhydrides. And when the quantity of organosilane compound is in the range of about 0.1 to about 4.0 molar equivalents, the organosilane compound acts as slip agent and nucleating agent in the production of film from said modified polyolefin.

In the following examples which are given to illustrate the invention without limiting all parts are by weight.

EXAMPLE 1

Ninety parts of crystalline polypropylene pellets having a melt index of 1.2, 10 parts of crystalline polypropylene powder having a melt index of 5.0, 1 part of endo-bicyclo[2.2.1]-5-heptene-2,3-dicarboxylic anhydride and 0.5 parts of di-tert-butyl peroxide were mixed and passed through an extruder the barrel temperature of which was adjusted to 190° C. (screw diameter: 40 mm, L/D=25, screw revolution number: 60 rpm) to obtain modified polypropylene pellets.

In the thus obtained modified polypropylene pellets, 0.20% by weight of endo-bicyclo[2.2.1]-5-heptene-2,3-dicarboxylic anhydride was chemically combined to the polypropylene chain, but 0.53% by weight of the carboxylic acid anhydride remained as unreacted acid in the modified polypropylene. (The other carboxylic acid anhydride left through a vent hole near the end of the extruder, and was recovered by a cooler.) When this modified polypropylene was heated, molten and molded, an irritating odor of endo-bicyclo[2.2.1]-5-heptene-2,3-dicarboxylic anhydride was generated.

Also, a severe plate-out was observed on a chill-roll during the preparation of a film (having 25 microns thickness) from the modified polypropylene by a chill-roll film casting line.

The above mentioned modified polypropylene pellets were mixed with N-(β-aminoethyl)-γ-aminopropylmethyl dimethoxy silane, N-(β-aminoethyl)-γ-aminopropyl trimethoxy silane, γ-aminopropyl triethoxysilane, β-(3,4-epoxycyclohexyl)-ethyltrimethoxy silane and γ-glycidoxypropyltrimethoxy silane respectively, of an equimolar quantity to all the endo-bicyclo[2.2.1]-5-heptene-2,3-dicarboxylic anyhydride contained in the modified polypropylene, and obtained mixtures were passed through an extruder adjusted to 200° C. to effect the esterification reaction, thus obtaining five kinds of modified polypropylene (referred to as "silane-modifed polypropylene").

Films 25 microns in thickness were prepared by means of the chill-roll method from the modified polypropylenes obtained in this example and aluminum vacuum metallizings were carried out on the surfaces of the films without any pre-treatment, and then adhesion properties of the aluminum metallized films were measured.

The chill-roll film casting line used in the experiment consisted of a T-die having a lip-width of 762 mm which was mounted on an extruder having a screw diameter of 65 and L/D of 29, a chill-roll of 20 inches diameter having mirrowed surface, and a winding apparatus.

The films 25 microns in thickness were prepared under the condition of resin temperature of 230° C. and at a winding speed of 30 m/min.

A piece of film was cut from each of the thus obtained films, and then an aluminum vacuum metallizing was carried out on each piece of film by using a vacuum metallizer unit including a 6 inch-oil-diffusion vacuum pump. No pretreatment of the film was carried out.

In Table 1 are shown the quantity of unreacted carboxylic acid anhydride remaining in the silane-modified polypropylenes, the reaction efficiency for organosilane, peel strengths for aluminum foils (thickness: 0.1 mm) which were laminated to the modified polypropylenes by hot-pressing, operability and plate-out during film forming, gloss and transparency of the product films, and adhesion properties of vacuum metallized aluminum on them.

As is apparent from Table 1, the organosilane reacted selectively with unreacted endo-bicyclo[2.2.1]-5-heptene-2,3-carboxylic anhydride and fixed it in the modified polypropylene to thus prevent generation of an irritating odor during heating, and melting; furthermore, the silane-modified polypropylene had better adhesiveness than the modified polypropylene to which no organosilene was added.

It should also be noted that the modified polypropylene containing no organosilane had a relatively good vacuum metallizability (adhesion of aluminum layer) if no slip agent was added, but operability during film forming was extremely bad, resulting in a film which was uneven and formed creases when wound.

The poor operability during film forming was improved by adding a slip agent and a nucleating agent to the modified polypropylene, but the adhesion with aluminum film prepared by vacuum metallizing was decreased. On the other hand, the modified polypropylene with organosilane added according to the invention had good operability owing to the organosilane, and the plate-out on the chill roll was very little and both its transparency and gloss of the film was improved so that thin film with good appearance was obtained.

Adhesion properties (to the modified polypropylene with organosilane added according to the invention) of aluminum foil prepared by vacuum metallizing was better than that to the film which was prepared from an unsaturated carboxylic acid modified polypropylene containing no organosilane and slip agent. And the modified polypropylene of this invention, when diluted with unmodified polypropylene also kept the same properties.

Table 1

| Run No. | Organosilane Kind | Amount (wt. %) | Molar Ratio*1 | Unreacted Amount*2 (wt. %) | Percentage of the Anhydride Reacted with Organosilane (%) A*3 | B*4 | Peel Strength from Al-Foil*5 (Kg/cm) |
|---|---|---|---|---|---|---|---|
| 1. | None | 0 | 0 | 0.53 | — | — | 1.7 |
| 2. | N-(β-aminoethyl)-α-aminopropyl-methyldimethoxysilane | 0.92 | 1.0 | 0.03 | 94 | 28 | 3.0 |
| 3. | N-(β-aminoethyl)-α-aminopropyl-trimethoxysilane | 1.0 | 1.0 | 0.03 | 94 | 27 | 2.3 |
| 4. | α-amoinopropyl-triethoxy-silane | 0.80 | 1.0 | 0.02 | 96 | 27 | 2.5 |
| 5. | β-(3.4-epoxycylohexyl)-ethyltrimethoxysilane | 1.1 | 1.0 | 0.05 | 91 | 20 | 2.2 |
| 6. | α-glycidoxypropyl-trimethoxysilane | 1.1 | 1.0 | 0.04 | 92 | 22 | 2.0 |
| 7. | Resin prepared in Run No. 2 (40%) + Polypropylene (MI = 9) (60%), including no slip agent | | | | | | |
| 8. | Resin prepared in Run No. 1 + 0.1 wt % of oleic amide | | | | | | |
| 9. | Resin prepared in Run No. 1 + 0.1 wt % of oleic amide + 0.1 wt % of fine powdered silica | | | | | | |

| Run No. | | Irritating Odor during Heating & Processing | Operability in Film Forming*6 | Plate-out on the Chill Roll | Gloss of the Film | Transparency of the Film | Adhesion Properties of Vacuum Metallized Al-foil*7 |
|---|---|---|---|---|---|---|---|
| 1. | None | occurred | poor | much | good | good | good |
| 2. | N-(β-aminoethyl)-α-aminopropyl-methyldimethoxysilane | No | excellent | little | excellent | excellent | excellent |
| 3. | N-(β-aminoethyl)-α- | No | excellent | little | excellent | excellent | excellent |
| 4. | α-aminopropyl-triethoxy-silane | No | excellent | little | excellent | excellent | excellent |
| 5. | β-(3.4-epoxycyclohexyl)-ethyltrimethoxysilane | No | excellent | little | excellent | excellent | excellent |
| 6. | α-glycidoxypropyl-trimethoxysilane | No | excellent | little | excellent | excellent | excellent |
| 7. | Resin prepared in Run No. 2 (40%) + Polypropylene (MI=9) (60%), including no slip agent | | excellent | little | excellent | excellent | excellent |
| 8. | Resin prepared in Run No. 1 + 0.1 wt % of oleic amide | | good | much | good | good | poor |
| 9. | Resin prepared in Run No. 1 + 0.1 wt % of oleic | | good | much | good | good | poor |

Table 1-continued amide + 0.1 wt % of fine powdered silica

Notes

*1Molar ratio of organosilane added to all carboxylic acid anhydride in modified polypropylene.
*2Amount (wt %) of endo-bicyclo[2.2.1]-5-heptene-2, 3-dicarboxylic anhydride remaining in the modified polypropylene, which is not reacted with polypropylene nor with organosilane.
*3Mole % of uncombined endo-bicyclo[2.2.1]-5-heptene-2, 3-dicarboxylic anhydride reacted with organosilane compared to all the uncombined anhydride in the polymer.
*4Mole % of endo-bicyclo[2.2.1]-5-heptene-2, 3-dicarboxylic anhydride which is combined with polypropylene and organosilane compared to all the anhydride which is combined with polypropylene.
*5Measured by placing a modified polyproylene film of 0.1 mm in thickness as a specimen between two sheets of aluminum foil of 0.1 mm in thickness, pressing at 200° C and 10 Kg/cm² by means of a hot press 4 minutes, cutting the resulting sample to a width of 2 cm and then subjecting to an Instron Tension Universal Tester at a tension rate of 5 cm/min.
*6
poor: A film-roll lacking uniformity and having many creases which occurred during the winding of the film was obtained.
excellent: A fine film-roll with uniformity without creases was obtained.
good: between poor and excellent
*7
poor: Almost all of the aluminum foil was peeled off after a cellulose-adhesive-tape-test.
good: Almost all of the aluminum foil remained after a cellulose-adhesive-tape-test.
excellent: Aluminum foil did not peel off after a cellulose-adhesive-tape-test.

EXAMPLE 2

Ninety parts of crystalline polypropylene pellets having a melt index of 1.2, 10 parts of crystalline polypropylene powder having a melt index of 5.0, 1.0 parts of endo-bicyclo[2.2.1]-5-heptene-2,3-dicarboxylic anhydride and 0.4 part of 2.5-dimethyl-2.5-di-terbutylperoxyhexyine-3 were mixed, and the mixture thus obtained was fed from a hopper to an extruder having a screw diameter of 50 mm, L/D ratio of 32, liquid inlet under pressure at the position of L/D ratio of 16 from the feed inlet and vent hole at the position of L/D ratio of 24, which barrel temperature was adjusted to 190–200° C., and reaction of the polypropylene and the anhydride was carried out in the extruder at a screw revolution number of 110 rpm, while N-(β-aminoethyl)-γ-aminopropylmethyldimethoxysilane or γ-glycidoxypropyl-trimethoxysilane in a quantity of 0.75 molar equivalent to the carboxylic acid anhydride was introduced forcibly from the above described liquid inlet under pressure by using a pump and the reaction of the component of the mixture with organosilane was carried out in the later part of the extruder.

The molten strands of the organosilane-modified polypropylene were discharged from the die of the extruder, cooled by water and then pelletized.

In another modified polypropylene obtained in a similar manner except not adding the organosilane, for comparison, 0.30% by weight of endo-bicyclo[2.2.1]-5-heptene-2,3-dicarboxylic anhydride was chemically combined and 0.57% by weight of the unreacted carboxylic acid anhydride was contained.

The other carboxylic acid anhydride was discharged from the vent hole, and it was cooled and recovered. In this experiment, a marked irritating odor was generated when the modified polypropylene was extruded from the die.

The results are tabulated below:

Table 2

| | | | | Endo-bicyclo[2.2.1.]-heptene-2, 3-dicarboxylic acid anhydride | | | |
|---|---|---|---|---|---|---|---|
| Run No. | Kind of Silane | Amount of Added (wt %) | Molar Ratio *1 | Unreacted Amount *2 (wt %) | Percentage of the Anhydride Reacted with Organosilane (%) A*3 | B*4 | Peel Strength from Al-foil *5 (Kg/cm) | Irritating Odor during Heating & Processing |
| 10. | None | 0 | 0 | 0.57 | — | — | 1.7 | occurred |
| 11. | N-(β-aminoethyl)-Γ-aminopropyl-methyl-dimethoxysilane | 1.25 | 0.75 | 0.04 | 93 | 27 | 3.4 | No |
| 12. | Γ-glycidoxypropyl-trimethoxy silane | 1.44 | 0.75 | 0.05 | 91 | 18 | 2.4 | No |

*Notes *1, *2, *3, *4 and *5 are same as those of Table 1.

EXAMPLE 3

98.4 parts of crystalline polypropylene powder having a melt index of 0.6, 1.0 part of endo-bicyclo-[2.2.1]-5-heptene-2, 3-dicarboxylic anhydride, 0.3 part of di-tert-butylperoxide and 0.3 part of N-(β-aminoethyl)-γamino-propylmethyldimethoxy silane were mixed, and the mixture was fed from a hopper to an extruder having a screw diameter of 65 mm, L/D ratio of 30, barrel temperature of the extruder was adjusted to 190°–200° C., and the reaction was carried out in the extruder at a screw revolution number of 110 rpm.

The molten strands of the organosilane-modified polypropylene were discharged from a die of the extruder, cooled by water and then pelletized. In the thus obtained modified polypropylene pellets, 0.10% by weight of endobicyclo[2.2.1]-5-heptene-2, 3-dicarboxylic anhydride was left unreacted and only a slight irritating odor was generated when the modified polypropylene was extruded from the die.

In another modified polypropylene obtained in a similar manner except not adding N-(β-aminoethyl)-γ-aminopropylmethyldimethoxy silane, for comparison, 0.48% by weight of unreacted endo-bicyclo[2.2.1]-5-heptene-2, 3-dicarboxylic anhydride was found to be present. In this case, an irritating odor was generated when the modified polypropylene was extruded from the die.

The results are tabulated below.

Table 3

| Run No. | N-(β-aminoethyl) Γ-aminopropylmethyl-dimethoxysilane Amount of Added (wt %) | Molar Ratio*1 | Endo-bicyclo[2.2.1]-5-heptene-2, 3-dicarboxylic anhydride Unreacted Amount*2 (wt %) | Peel Strength from Al-foil*3 (Kg/cm) | Irritating Odor during Heating & Processing |
|---|---|---|---|---|---|
| 13 | 0 | 0 | 0.48 | 1.7 | occurred |
| 14 | 0.3 | 0.42 | 0.10 | 4.2 | little |

Notes *1Molar ratio of the aminosilane added to endo-bicyclo[2.2.1-5-heptene-2, 3-dicarboxylic anhydride in the extruder reactio feed.
*2Endo-bicyclo[2.2.1]-5-heptene-2, 3-dicarboxylic anhydride remaining in the modified polypropylene, which is not reacted with polypropylene nor with aminosilane.
*3Same as Note *5 of Table 1.

EXAMPLE 4

Using the same extruder used in Example 2, the procedure of Example 2 was repeated except using 1 part of maleic anhydride in place of endo-bicyclo[2.2.1]-5-heptene-2, 3-dicarboxylic anhydride and using, as an organosilane, γ-aminopropyltriethoxysilane in a quantity of 0.50 molar equivalent to the maleic anhydride used, thus obtaining modified polypropylene pellets (Run No. 15). For comparison a γ-aminopropyltriethoxysilane-free experiment was carried out (Run No. 16). In each case, a film was prepared from the resulting pellets by means of a chill-roll-film-making apparatus. An irritating odor of unreacted maleic anhydride was generated during preparation of the modified polypropylene and during preparation of the film and a substantial plate-out was observed on the chill-roll during film making, whilst there was no irritating odor in the case of the aminosilane added modified polypropylene, and plate-out during preparation of the film was reduced remarkably. The peel strength to aluminum, measured in a manner similar to that of Example 1, was 1.5 Kg/cm in the case wherein no aminosilane was added and 2.5 Kg/cm in the case wherein aminosilane was added.

EXAMPLE 5

The procedure of Example 4 was repeated except that 1 part of cis-4-cyclohexene-1, 2-dicarboxylic anhydride was used in place of maleic anhydride and that, as an organosilane, N-(β-aminoethyl)-γ-aminopropyl-trimethoxysilane was used, in a quantity of 0.7 molar equivalent to the cis-4-cyclohexene-1, 2-dicarboxylic anhydride used, to obtain modified polypropylene pellets. An irritating odor of unreacted carboxylic acid anhydride was generated during preparation of the modified polypropylene and during film making in the case wherein no aminosilane was added (Run No. 17,) while there was no irritating odor in the case wherein the aminosilane was added (Run No. 18). The peel strength for aluminum was 0.6 Kg/cm in the case wherein no aminosilane was added and 1.1 Kg/cm in the case wherein the aminosilane was added.

EXAMPLE 6

100 parts of high pressure process polyethylene pellets having a melt index of 7.0 and density of 0.925, 0.5 part of endo-bicyclo[2.2.1]-5-heptene-2, 3-dicarboxylic anhydride and 0.1 part of bis (tert-butylperoxyisopropyl) benzene were mixed and passed through the extruder used in Example 1, the barrel temperature of which was adjusted to 190° C., thus obtaining modified polyethylene pellets. In the thus obtained modified polyethylene pellets, 0.25% by weight of endo-bicyclo[2.2.1]-5-heptene-2, 3-dicarboxylic anhydride was chemically combined and 0.20% by weight of unreacted dicarboxylic anhydride was present. When this modified polyethylene was subjected to melting and molding to give a film, for example, an irritating odor due to the unreacted dicarboxylic anhydride was produced and plate-out on the chill-roll during preparation of the film was marked. The peel strength for aluminum was 1.7 Kg/cm (Run No. 19).

To this modified polyethylene was added 0.3% by weight of N-(β-aminoethyl)-γ-aminopropyl-trimethoxysilane, i.e. corresponding to 0.5 molar equivalent to all the carboxylic acid anhydride contained in the modified polyethylene and the mixture was passed through the above described extruder (200° C.) to effect the amidification reaction. Consequently, 80% of the unreacted carboxylic acid was converted to amide form, and the quantity of the unreacted carboxylic acid was reduced to 0.04% by weight and hardly any irritating odor was detected during molding. The peel strength for aluminum was 2.0 Kg/cm (Run No. 20).

EXAMPLE 7

100 parts of crystalline ethylene-propylene copolymer having an ethylene content of 7.2% by weight and a melt index of 1.0, 1 part of endo-bicyclo[2.2.1]-5-heptene-2, 3-dicarboxylic anhydride and 0.3 part of di-tert-butyl peroxide were mixed and passed through the extruder used in Example 1, the barrel temperature of which was adjusted to 190° C., thus obtaining modified ethylene-propylene copolymer pellets.

In the thus obtained modified ethylene-propylene copolymer pellets, 0.30% by weight of endo-bicyclo-[2.2.1]-5-heptene-2, 3-dicarboxylic anhydride was chemically combined and 0.35% by weight of the dicarboxylic acid anhydride was left unreacted in the modified copolymer. When this modified ethylene-propylene copolymer was heated, molten and molded, the unreacted endo-bicyclo[2.2.1]-5-heptene-2, 3-dicarboxylic anhydride was released to give an irritating odor. The peel strength for aluminum was 2.3 Kg/cm (Run No. 21).

To these modified ethylene-propylene copolymer pellets was added 0.5% by weight of N-(β-aminoethyl)-γ-aminopropyltrimethoxysilane, i.e. corresponding to 0.4 molar equivalent to all the endo-bicyclo[2.2.1]-5-heptene-2, 3-dicarboxylic anhydride contained therein and the resulting mixture was passed through the extruder adjusted to 190° C. to effect the amidification reaction. When this modified ethylene-propylene copolymer was subjected to melting and molding, hardly any irritating odor was generated and plate-out on the chill roll was decreased remarkably. The peel strength for aluminum was 3.2 Kg/cm (Run No. 22).

EXAMPLE 8

Ninety-five parts of crystalline polypropylene pellets having a melt index of 0.8, 5 parts of crystalline polypropylene powder having a melt index of 5.0, 1 part of endo-bicyclo[2.2.1]-5-heptene-2, 3-dicarboxylic anhydride and 0.5 part of di-tert-butylperoxide were mixed, and then the modified polypropylene was obtained by passing through an extruder (screw diameter: 60 mm, L/D = 27, screw revolution number, 70 rpm) with barrel temperature adjusted to 190° C.

In the thus obtained modified polypropylene pellets, 0.28wt% of endo-bicyclo[2.2.1 -5-heptene-2, 3-dicarboxylic anhydride was chemically combined, but 0.45 wt% of said anhydride remained unreacted in the modified polypropylene. (The remainder of said anhydride passed off through a vent hole near end of the extruder, and was recovered by a cooler.)

Twenty parts of the modified polypropylene, 60 parts of crystalline polypropylene having a melt index of 15, 20 parts of glass fiber chopped strands, of which the surfaces were not treated with surface treating agent (400 glass fibers of 10 microns in diameter being bundled and chopped in a length of 6 mm) and 0.3 part of γ-aminopropyltriethoxy silane were mixed in the tumble mixer, and then modified polypropylene containing glass fibers was obtained by passing the mixture through an extruder (screw diameter: 60 mm, L/D = 27, screw revolution No. 70 rpm) barrel temperature of which was adjusted to 230° C. (Run No. 23) For comparison, modified polypropylene pellets containing glass fibers were obtained by same manner as in the above experiment except γ-aminopropyltriethoxysilane was not added (Run No. 24).

In the case using amino silane, an irritating odor was not generated, but in the case of using no amino silane, a marked irritating odor of the anhydride was generated from the molten strands extruded from the die of extruder. Test pieces were prepared from both types of pellets by means of injection molding; in the case wherein the modified polypropylene without added amino silane was used, an irritating odor was generated; but in the case of the modified polypropylene with added amino silane, no irritating odor was generated.

In Table 4 are shown the test results of each test piece. The modified polypropylene containing glass fibers to which amino silane was added, has good mechanical properties compared with the modified polypropylene containing glass fiber to which no amino silane was added.

Table 4

| Run No. | 23 | 24 |
|---|---|---|
| Γ-aminopropyl triethoxy silane | Added | Not added |
| Mechanical Properties (23° C) | | |
| Tensile Strength (Kg/cm$^2$) (ASTM D-638) | 650 | 400 |
| Bending Strength (Kg/cm$^2$) (ASTM D-790) | 730 | 580 |
| Bending Modulus (Kg/cm$^2$) (ASTM D-790) | 35,000 | 35,000 |
| Izod Impact Strength Notched (Kg-cm/cm$^2$) (ASTM D-256) | 7 | 4 |
| Irritating odor during heating, melting, mixing with glass fibers, and injection molding | no | occurred |

EXAMPLE 9

Forty parts of crystalline polypropylene pellets having melt index of 15 and 20 parts of glass fiber chopped strands the surfaces of which were treated and not treated with γ-aminopropyltriethoxysilane (400 glass fibers of 13 microns in a diameter being bundled and chopped to a length of 6 mm) were added respectively to (a) 40 parts of the modified polyolefin without adding organoxilane obtained in Run No. 1 in Example 1, (b) 40 parts of N-β-aminoethyl)-γ-aminopropyl-methyldimethoxy silane modified polypropylene and (c) 40 parts of γ-glycidoxy-propyltrimethoxysilane modified polypropylene, and (c) 40 parts of γ-glycidoxy-propyltrimethoxysilane modified polypropylene, in a tumole mixer, and then modified polypropylene containing glass fibers was obtained by passing each mixture separately (a, b, c) through the extruder with temperature adjusted to 230° C. (screw diameter: 40 mm, L/D = 25, screw revolution number: 49 rpm). In the case wherein amino silane was not used, a marked irritating odor was generated from the molten resin strands discharged from the die of the extruder, whilst there was no irritating odor in the case wherein the organosilane was used.

When test pieces were prepared from the modified polypropylene glass fiber by injection molding, an irritating odor was generated in the case of modified polypropylene without added organosilane whilst there was no irritating odor in the case of the modified polypropylene with organosilane added.

In the Table 5 are shown the results of physical propertis of each test piece. The modified polypropylene containing glass fibers to which amino silane was added, has improved mechanical properties compared with the modified polypropylene containing glass fibers to which no amino silane was added.

Table 5

| Run No. | 25 | 26 | 27 | 28 | 29 | 30 |
|---|---|---|---|---|---|---|
| Glass fiber | Treated with γ-aminopropyl-triethoxysilane | | | Not treated | | |
| Organosilane added to modified polypropylene | No | N-(β-aminoethyl-γ-aminopropyl-methyldimethoxy silane | Γ-glycidoxy propyl-trimethoxy silane | No | N-(β-aminoethyl-γ-aminopropyl-methyldimethoxy silane | γ-glycidoxy propyl-trimethoxy silane |
| Mechanical Properties (23° C.) | | | | | | |
| Tensile Strength (Kg/cm$^2$) (ASTM D-638) | 850 | 900 | 870 | 420 | 690 | 640 |
| Bending Strength (Kg/cm$^2$) (ASTM D-790) | 1,140 | 1,170 | 1,150 | 590 | 780 | 720 |
| Bending Modulus (Kg/cm$^2$) | 35,100 | 35,400 | 35,200 | 35,000 | 35,100 | 35,000 |
| Izod Impact Strength Notched (Kg-cm/cm$^2$) | 10 | 11 | 10 | 4 | 8 | 7 |
| Irritating odor during heating, melting, mixing with glass fibers and injection molding | Occurred | No | No | Occurred | No | No |

EXAMPLE 10

Ninety-five parts of crystalline polypropylene pellets having a melt index of 0.8, 5 parts of crystalline polypropylene powder having a melt index of 5.0, 0.5 part of endo-bicyclo[2.2.1]-5-heptene-2, 3-dicarboxylic anhydride, 0.2 part of di-tert-butyl peroxide, 25 parts of glass fiber chopped strands the surfaces of which were not treated with any surface treating agent (400 glass fibers of 10 microns in diameter being bundled and chopped to a length of 6 mm) and 0.2 part of γ-aminopropyl triethoxy silane were mixed in the tumble mixer, and then modified polypropylene containing glass fibers was obtained by passing the mixture through the extruder (screw diameter: 60 mm, L/D = 27, screw revolution No. 70 rpm) with barrel temperature adjusted to 230° C. (Run No. 31). As comparison, modified polypropylene containing glass fibers was obtained with the exception that γ-aminopropyl triethoxy silane was not added (Run No. 32).

In the case using γ-aminopropyl triethoxy silane, no irritating odor was generated, whilst there was a marked irritating odor of the unreacted dicarboxylic anhydride generated from the molten resin strands discharged from a die of the extruder when no γ-aminopropyl triethoxy silane was used.

Test pieces were prepared from both types of pellets by means of injection molding. The modified polypropylene containing glass fibers without added γ-aminopropyl triethoxy silane generated an irritating odor. In the case of the modified polypropylene containing glass fibers with added γ-aminopropyl triethoxy silane no irritating odor was generated.

In Table 6 are shown the test results of each test piece. The modified polypropylene containing glass fibers to which γ-aminopropyl triethoxy silane was added has good mechanical properties compared with that of the modified polypropylene wherein γ-aminopropyl triethoxy silane was not added.

Table 6

| Run No. | 31 | 32 |
|---|---|---|
| γ-aminopropyl triethoxy silane | Addition | No |
| Mechanical Properties (23° C.) | | |
| Tensile Strength (Kg/cm$^2$) (ASTM D-638) | 720 | 410 |
| Bending Strength (Kg/cm$^2$) (ASTM D-790) | 800 | 590 |
| Bending Modulus (Kg/cm$^2$) (ASTM D-790) | 35,000 | 34,900 |
| Izod Impact Strength Notched (Kg-cm/cm$^2$) (ASTM D-256) | 7 | 4 |
| Irritating odor during heating, melting, mixing with glass fibers, and injection molding | No | Occured |

What is claimed is:

1. In a process for the production of polyolefins modified during an addition reaction with one or more alicyclic carboxylic acids having a cis form non-conjugated double bond, alpha beta unsaturated carboxylic acids or their anhydrides and optionally untreated or silane pretreated glass fibers in the presence of a radical producing agent in an extruder, the improvement which comprises reacting the modified polyolefin in the molten state with an effective amount of an aminosilane or epoxysilane whereby unreacted unsaturated carboxylic acids or anhydrides remaining in the modified polyolefin are fixed into the polyolefin.

2. The process according to claim 1 wherein the modified polyolefin is reacted with the organosilane compound during the addition reaction.

3. The process according to claim 1 wherein the modified polyolefin is reacted with the organosilane compound after the addition reaction.

4. The process according to claim 1 wherein the organosilane compound is selected from the group consisting of γ-aminopropyltriethoxysilane, N-(β-aminoethyl)-γ-aminopropyltrimethoxysilane and N-(β-aminoethyl)-γ-aminopropyl-methyldimethoxysilane.

5. The process according to claim 1 wherein the organosilane compound is selected from the group consisting of β-(3, 4-epoxycyclohexyl)-ethyltrimethoxysilane and γ-glycidoxypropyl-trimethoxysilane.

6. In a process for the production of modified polyolefins by combining a polyolefin with one or more alicyclic carboxylic acids having a cis form non-conjugated double bond, alpha beta unsaturated carboxylic acids and their anhydrides and optionally untreated or silane pretreated glass fibers in the presence of a radical producing agent in an extruder, the improvement which comprises reacting the modified polyolefin in the molten state with an aminosilane or an epoxysilane wherein the organosilane compound is added in the proportion of about 0.1 to about 4.0 molar equivalents relative to all the carboxylic acid or anhydride thereof in the modified polyolefin.

7. The process according to claim 6 wherein the aminosilane or epoxysilane is added in the proportion of about 0.2 to about 2.0 molar equivalents relative to the carboxylic acid or anhydride present in the modified polyolefin.

8. In a process for the production of modified polyolefins by combining a polyolefin with one or more alicyclic carboxylic acids having a cis form non-conjugated double bond, alpha beta unsaturated carboxylic acids and their anhydrides in the presence of a radical producing agent in an extruder, the improvement which comprises adding untreated or silane pretreated glass fibers and reacting the modified polyolefin in the molten state with an aminosilane or an epoxysilane.

9. The process according to claim 1, wherein the modified polyolefin contains silane pretreated glass fibers.

10. The process according to claim 1, wherein the modified polyolefin contains untreated glass fibers.

11. The process according to claim 6, wherein the modified polyolefin contains silane pretreated glass fibers.

12. The process according to claim 6, wherein the modified polyolefin contains untreated glass fibers.

13. The process according to claim 8, wherein the modified polyolefin contains silane pretreated glass fibers.

* * * * *